United States Patent

Yokomizo

[11] Patent Number: 6,163,796
[45] Date of Patent: *Dec. 19, 2000

[54] NETWORK SYSTEM HAVING PLURAL MULTIMEDIA SERVERS FOR DIFFERENT TYPES OF DATA

[75] Inventor: Yoshikazu Yokomizo, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/957,385

[22] Filed: Oct. 23, 1997

Related U.S. Application Data

[63] Continuation of application No. 08/297,766, Aug. 30, 1994.

[30] Foreign Application Priority Data

Aug. 31, 1993 [JP] Japan ................................. 5-215590

[51] Int. Cl.[7] ............................................ G06F 15/16
[52] U.S. Cl. .................................... 709/203; 709/217
[58] Field of Search ................. 395/200.33, 200.49, 395/200.55, 200.53, 200.34, 200.54; 709/203, 219, 225, 223, 224, 217, 204

[56] References Cited

U.S. PATENT DOCUMENTS

| | | | |
|---|---|---|---|
| 4,058,838 | 11/1977 | Crager et al. | 358/257 |
| 4,918,588 | 4/1990 | Barrett et al. | 395/600 |
| 4,918,596 | 4/1990 | Nakano | 395/675 |
| 5,058,185 | 10/1991 | Morris et al. | 382/305 |
| 5,060,165 | 10/1991 | Schumacher et al. | 364/478 |
| 5,065,254 | 11/1991 | Hishida | 358/400 |
| 5,068,888 | 11/1991 | Scherk et al. | 379/100 |
| 5,153,936 | 10/1992 | Morris et al. | 395/128 |
| 5,170,466 | 12/1992 | Rogan et al. | 395/145 |
| 5,267,047 | 11/1993 | Argenta et al. | 358/400 |
| 5,321,816 | 6/1994 | Rogan et al. | 364/408 |
| 5,325,527 | 6/1994 | Cwikowski et al. | 395/650 |
| 5,329,619 | 7/1994 | Page et al. | 395/200.01 |
| 5,332,266 | 7/1994 | Boaz et al. | 395/200.01 |
| 5,357,345 | 10/1994 | Nakano et al. | 358/403 |
| 5,384,835 | 1/1995 | Wheeler et al. | 379/442 |
| 5,535,322 | 7/1996 | Hecht | 395/155 |
| 5,630,061 | 5/1997 | Richter et al. | 395/200.02 |
| 5,712,906 | 1/1998 | Grady et al. | 379/93.17 |

OTHER PUBLICATIONS

Richard Sherpe, "Just What is SMB?", http://samba.anv.edu.au/cifs/docs/what-is-smb.htnl, Sep. 1996 pp 1–9.

Kienzle et al, "Multimedia file serving with the OS/390 LAN Server," http://www.almaden.ibm.com/Journal/sg/363/kienzle.html Feb. 1997 pp. 1–19.

W. Simpson, "The Point–to–Point Protocol (PPP)," Network Working Group, RFC 1331, May 1992 pp. 1–66.

*Primary Examiner*—Mehmet B. Geckil
*Attorney, Agent, or Firm*—Fitzpatrick, Cella, Harper & Scinto

[57] ABSTRACT

In order to provide a common access method to a plurality of servers, there is disclosed the following system. That is, when a client requests a service, the client issues a process script to a center server, and the center server executes protocol conversion and data conversion and accesses an existent server to be utilized in a language inherent thereto. The center server returns a final result from the existent server to the client.

15 Claims, 7 Drawing Sheets

NETWORK SYSTEM HAVING PLURAL MULTIMEDIA SERVERS FOR DIFFERENT TYPES OF DATA

This application is a continuation of application Ser. No. 08/297,766 filed Aug. 30, 1994.

BACKGROUND OF THE INVENTION

1. Field of the Invention

The present invention relates to a network system and a multimedia server.

2. Related Background Art

As various terminals acquire a communication functions along with the progress of networking, interconnectability becomes very important. For example, in the case of a facsimile apparatus, as a method of accessing a public network, a facsimile communication protocol defined by the CCITT exists. However, when a facsimile apparatus is utilized as a FAX server to constitute a network, no standard protocol is available yet.

As for a relational database (RDB), the SQL language of the ANSI is used as the standard language for the present. However, software vendors adopt different access protocols to the RDB and different front-end interfaces (so-called APIs). As for printing, although standards exist in units of OSs, the architectures of network printers in a multivendor environment are not standardized. Since an OCR conventionally has no concept associated with networking, an access method of the OCR on a network is a problem to be considered in the future. In addition, no concept associated with an image processing accelerator on a network exists at present.

As described above, although efforts for the standardization in units of individual application fields have been made, no cross-field standardization is available. For example, in order to execute a series of operations for, e.g., converting an image received by a FAX server into codes using an OCR server, and storing the codes in a database, since the servers do not have compatibility, the client side must activate three client programs, i.e., a facsimile program, an OCR program, and a database, and must execute operations one after another.

Nevertheless, the three programs may automate the above-mentioned operations by inter-application communications by fully utilizing functions provided by the latest OS. However, although the latest OS provides an inter-application communication mechanism, it leaves the method of utilizing the mechanism to a user, and is not a practical solution to the problem.

Conventionally, methods of accessing various servers have been individually developed. However, a demand has arisen for a single, easy common access method capable of accessing various servers. In other words, a seamless, efficient server environment is demanded.

For example, as described above, assuming a series of operations for, e.g., converting an image received by a FAX server into codes using an OCR server, and storing the codes in a database, as described above, since the servers do not have compatibility, the client side must activate three client programs, i.e., a facsimile program, an OCR program, and a database, and must execute operations one after another. However, most of the operations are repetitions of "cut & paste" and an access to a "temporary file", resulting in troublesome operations.

In addition, the methods of accessing servers are inevitably different one from another considering the situation in which they were invented, and it is almost impossible to make accesses across different service fields.

SUMMARY OF THE INVENTION

The present invention has been made in consideration of the above situation, and has as its object to provide a network system which can satisfactorily execute efficient processing.

It is another object of the present invention to provide a network system and a multimedia server, which can utilize many server functions without requiring a plurality of applications.

It is still another object of the present invention to provide a network system and a multimedia server with high operability.

In order to achieve the above objects, according to a preferred aspect of the present invention, there is disclosed a system in which an exchange and a server having an interface for controlling the exchange are arranged on a network, a first client on the network is connected to a second client on the network, the first client issues a command for connecting the first and second clients via the line, and the server connects the first and second clients via the line in accordance with the command. With this arrangement, each client can utilize service functions of different servers using a common API, and a local area network (LAN) whose main role is to perform packet transmission but is inefficient in data transmission of a real-time system can be organically coupled to an exchange which is capable of exchange of audio/dynamic image data but is inefficient in multi-address communications and intelligent control. As a result, a video conference system can be easily constituted.

It is still another object of the present invention to provide a system and a server, which can easily constitute a video conference system using even commercially available personal computers.

Other objects and features of the present invention will become apparent from the following description of the embodiment taken in conjunction with the accompanying drawings.

DETAILED DESCRIPTION OF THE PREFERRED EMBODIMENTS

The preferred embodiments of the present invention will be described in detail hereinafter with reference to the accompanying drawings.

In order to utilize functions provided by a server, a communication link called a server/client is normally set. The client is a computer terminal operated by a user, and the server is a computer which exists somewhere on the network and provides services. The server and the client are normally connected via a LAN (including a WAN) and exchange various predetermined commands to exchange services in cooperation with each other. At this time, commands to be exchanged exist only on the time base, and information actually received by the server and the client is only data as a processing result.

As for an access to a single server, after predetermined service start commands are exchanged, data is transmitted/ received, the server processes the received data and sends back the processed data to the client, and thereafter, service end commands are exchanged. In this manner, an access to one server is completed. Therefore, when the client accesses three different servers, the above-mentioned process is repeated three times.

In this embodiment, a processing sequence for a plurality of different services is described in a description format called a "process script", and a set of the process script and data to be processed are transmitted to a given server. Thereafter, the data is processed while the set of the process script and the data are sequentially transmitted among a plurality of corresponding servers "in rotation" (sequential batch passing). Since the client need only wait for the final result, it can execute another operation during this interval, and the throughput can be improved.

Since most of server systems have huge amounts of past resources, it is often difficult to replace such servers by new servers. For this reason, this embodiment proposes a mechanism in which a center server which indirectly executes an access to such an existent server for a new server is arranged, the client accesses the center server by a standard access method, and the center server indirectly controls the existent server. In this case, it is particularly important that the client need not know whether the center server is a "real server" which actually provides service functions or a "virtual server" which merely controls a slave server.

Since the servers are controlled using scripts, various applications are available. The transmission method of a script includes "simultaneous transmission" and "sequential transmission" methods. The simultaneous transmission method is executed in a batch manner, and the above-mentioned "in rotation" processing (sequential batch passing) corresponds to this method. On the other hand, the sequential transmission method is an on-line connection method. That is, in this method, data received by a server is displayed on an image plane in real time, and an operator instructs the next processing.

In the embodiment of the present invention, a single virtual integrated server is constituted on the network to provide various services. The integrated server is one obtained by logically integrating servers distributed on the network, and consists of a plurality of conventional function servers which provide various services, and a single center server for controlling these servers. The center server may be a special-purpose server or may be realized by a client.

When the center server is viewed from the client, the plurality of function servers distributed on the network seem like a single integrated giant server. Of course, the client can access individual servers as in a conventional system. However, the client can quickly start the next operation when it passes a process script to the center server to leave the following processing to the center server, resulting in efficient processing.

Figure 1:
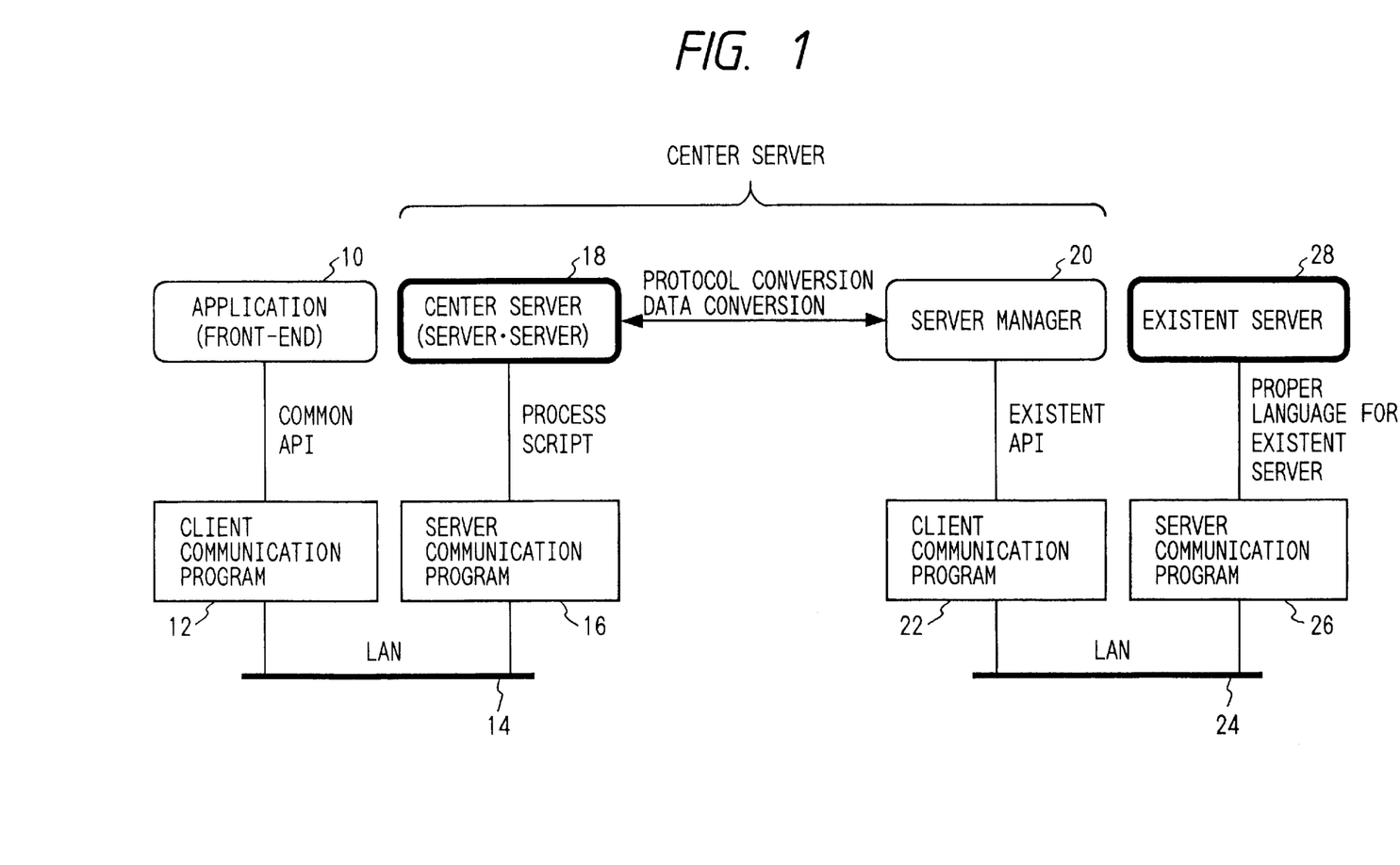
FIG. 1 is a diagram for explaining a method of accessing an existent server via a center server.

FIG. 1 is a diagram for explaining the method of accessing an existent server via the center server in this embodiment. A system shown in FIG. 1 includes an application 10 as a front-end for accessing a server, a client/server type communication program 12, a local area network (LAN) 14, and a client/server type communication program 16. A center server 18 provides a standard access environment integrated for the front-end application 10. When viewed from the front-end application 10, all services seem to be provided from the center server 18.

The center server 18 has a basic function of logically integrating various existent servers, but has no service function unlike normal servers. The center server 18 accesses an existent server 28 via a server manager 20 to respond to a request from the front-end application 10. A client communication program 22, a LAN 24, and a server communication program 26 respectively correspond to the communication program 12, the LAN 14, and the communication program 16, and have different data to be processed and interface structures from those of the communication program 12, the LAN 14, and the communication program 16.

A language (or a command) which accesses the existent server 28 is unique to the server owing to the history of development of each server. For this reason, the client/server communication programs 22 and 26 often have unique languages. Therefore, the languages of the client/server communication programs 22 and 26 are often different from those of the client/server communication programs 12 and 16 connected to the center server 18 for integrating a plurality of servers. Also, the LAN 24 need not always be the same as the LAN 14 for the same reason as above. For example, the LAN 14 may be an AppleTalk (a trademark of Apple Computer Inc.) network, and the LAN 24 may be an Ethernet (a trademark of Xerox Corp). The server manager 20 for controlling the existent server 28 serves as a front-end of the existent server 28, but an interface between the server manager 20 and the client communication program 22 is an existent API (Application Programming Interface).

On the other hand, the center server 18 provides an access method common to all the servers, and also provides a common API via the server/client communication programs 12 and 16. Therefore, protocol conversion and data conversion for absorbing a difference in architecture are performed between the center server 18 and the server manager 20. For this reason, the center server 18 and the server manager 20 operate in a single computer in close relation to each other. The combination of the center server 18 and the server manager 20 is the concept itself of the center server. Therefore, when its original functions must be clearly indicated, the center server 18 is called a server server.

Figure 2:
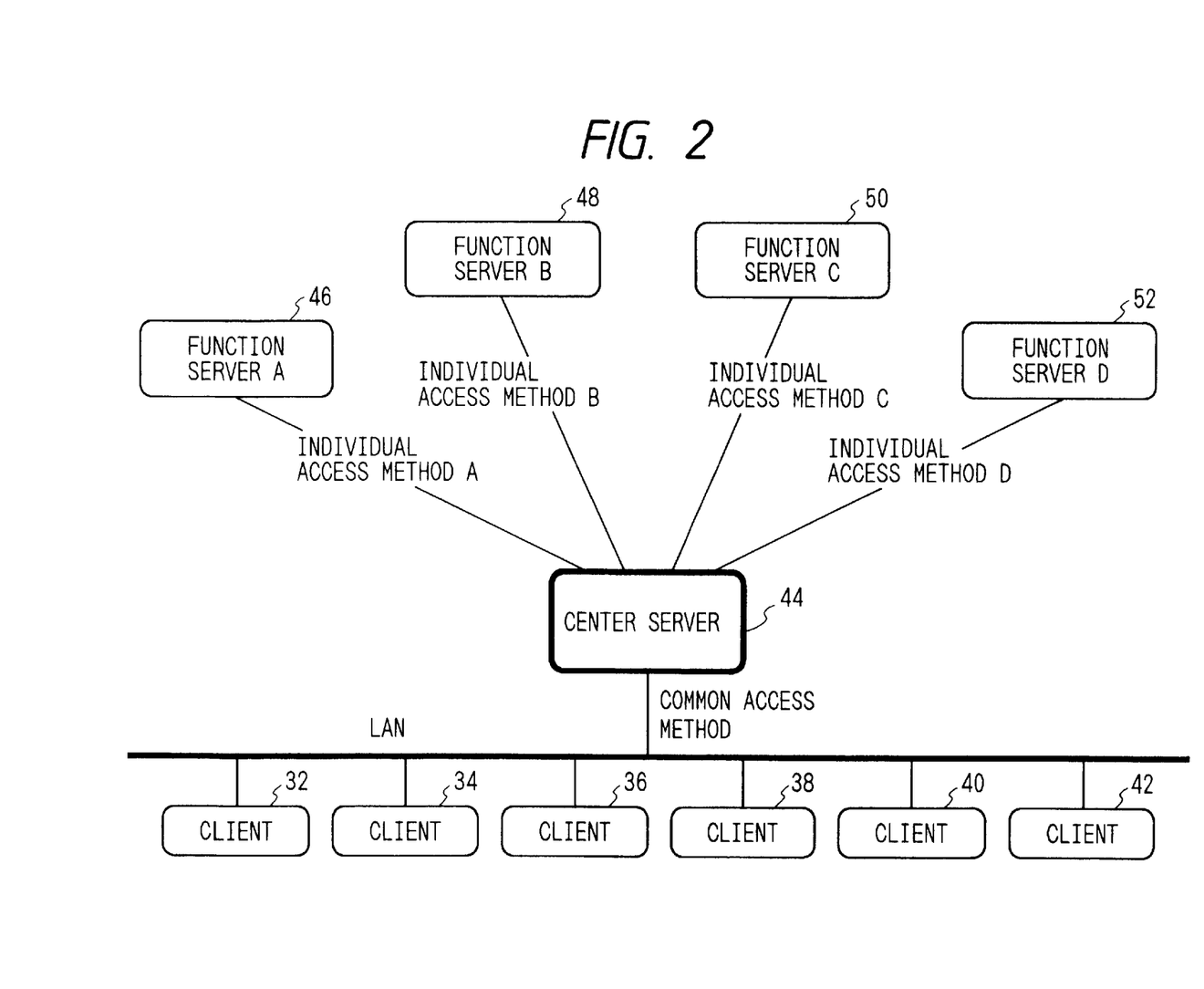
FIG. 2 is a diagram for explaining the method of accessing the existent server via the center server.

FIG. 2 is a diagram for explaining the access method to an existent server via the center server more easily. When each of clients 32 to 42 accesses a center server 44 by a common access method, the center server 44 selects access methods corresponding to required ones of servers 46 to 52 on the basis of a client's request, and accesses the required servers. Therefore, the clients 32 to 42 need not know not only access methods to the individual function servers A to D but also their existences.

Note that the function servers include a dynamic image transmission server.

In the multimedia server with the above-mentioned arrangement, the center server which transfers data via the network receives a message as a set of a predetermined process script and data issued by each client, and interprets the received message to perform communication protocol conversion and data conversion corresponding to each function server. Then, the center server transfers the process script and data via the network while executing continuous processing for the respective function servers. For this reason, even when each program of the client causes the center server to execute a plurality of functions, it need only transfer a process script and data corresponding to the composite function processing, thus obtaining required result data.

In addition, the center server, which receives a message as a set of a predetermined process script and data issued by each client, interprets the received message to execute communication protocol conversion corresponding to each function server, and transfers the process script to each function server via the network, is connected to the network. For this reason, even when each program of the client causes the center server to execute a plurality of functions, it need only transfer a process script and data corresponding to the composite function processing, thus obtaining required result data.

Furthermore, the function server which received the process script from the center server receives data from the client via the network on the basis of ID information in the process script. For this reason, the script and data can be independently transferred between clients and to each function server.

Moreover, the center server, which is connected to the network, receives a message as a set of a predetermined process script and data issued by each client, interprets the received message to execute communication protocol conversion and data conversion corresponding to each function server, and transfers the process script and data to each function server via the network, and an exchange exchanges telephone lines between clients and the center server. For this reason, during execution of each function processing, composite information can be transferred while parallelly executing multisessions of real-time information such as audio information between clients.

With this control, the processing sequences of the services of all servers are standardized by a single easy access, and a seamless, efficient server environment can be provided. For example, a series of composite operations for converting an image received by a FAX server into codes by an OCR server, and storing the codes in a database using a file server can be continuously processed by a single script. Therefore, repetitive processing operations of cut & paste operations and accesses to a temporary file, which are sequentially executed by starting three front-end programs (a FAX front-end, an OCR front-end, and a database front-end) at the client side can be greatly eliminated unlike in the conventional client-side processing.

Since independent servers distributed on the network can be virtually integrated, a client can easily utilize many server functions or composite server functions from a single application regardless of the compatibilities among servers.

Furthermore, access methods to server devices which have been independently developed by respective companies/industries are integrated, and means for accessing servers having different existent interfaces on the network by a single integrated access method can be provided. Embodiments will be described in detail below.

Figure 3:
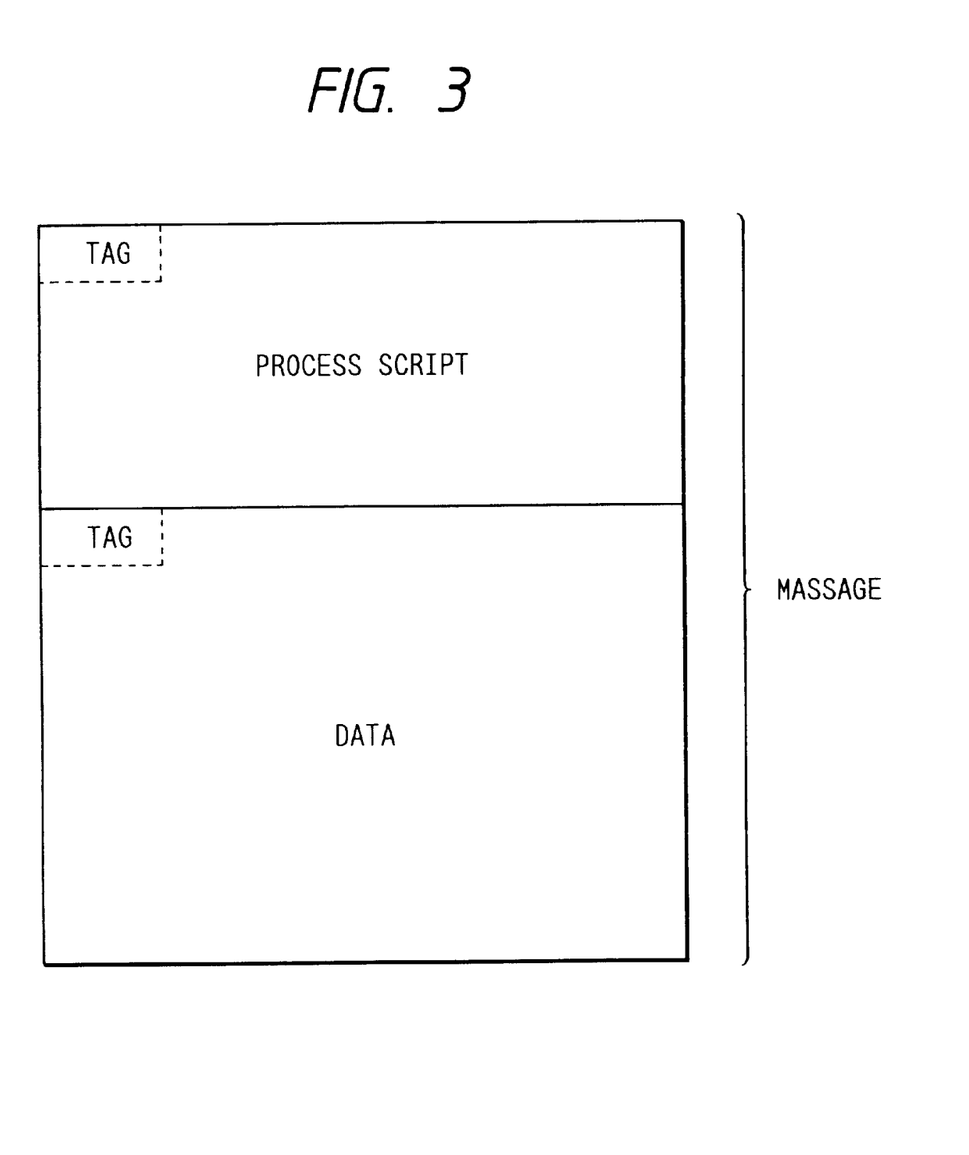
FIG. 3 is a view showing the format of a message.

FIG. 3 is a view for explaining the format of a message in the multimedia server of this embodiment. A message consists of a process script fork and a data fork. For the sake of simplicity, these forks will be simply referred to as a process script and data hereinafter. Each of the process script and data has a tag element having common contents. For the sake of simplicity, the tag element will be simply referred to as a tag hereinafter. In the tag, "time" of creation of a message, a "lifetime" until deletion of the message, a series of "ID numbers", a "type" of data, and a "signature" of an application which created data are described. Of these parameters, the "ID numbers" are indispensable, but other parameters are optional ones.

Figure 4:
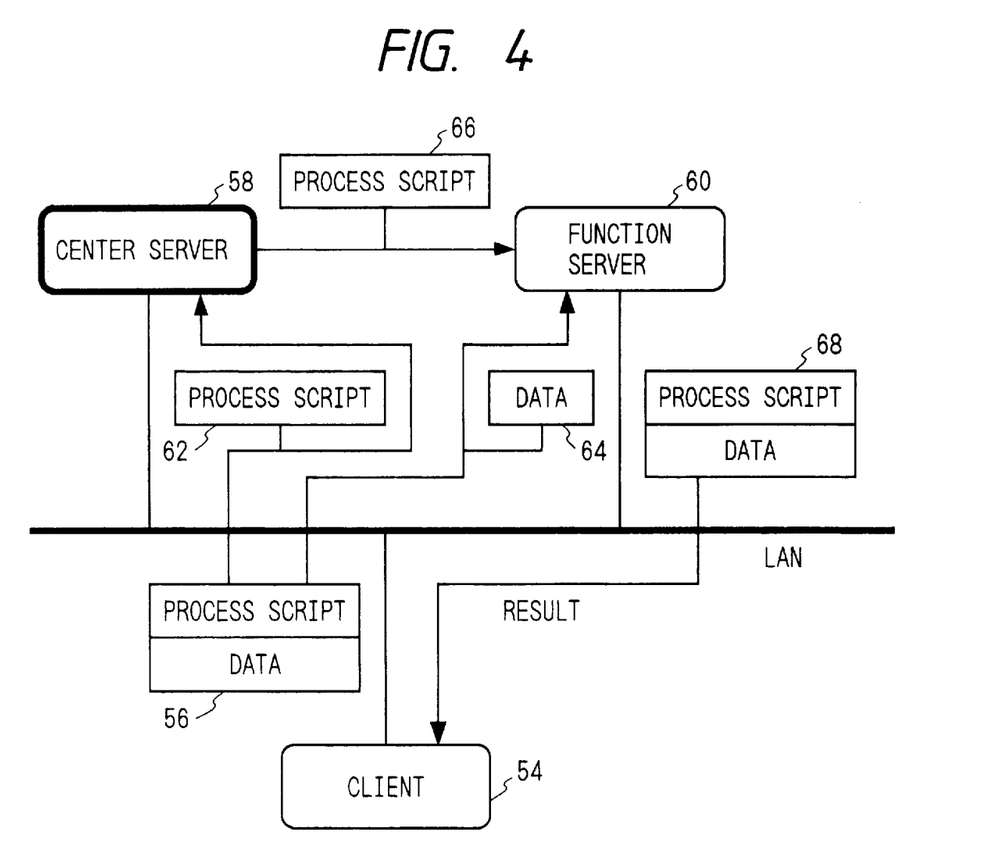
FIG. 4 is a diagram for explaining a method of transmitting a process script.

FIG. 4 is a diagram for explaining the method of sending the process script. A client 54, a center server 58, and a function server 60 are normally present on a single LAN. When the function server 60 is one which can understand a process script complying with this embodiment, the center server 58 informs this fact to the client. In this case, the client can separate a message 56 consisting of a process script and data into a process script fork 62 and a data fork 64, and can separately transmit them to the center server and the function server. The center server 58 executes required edit processing for the received process script 62, and then outputs a process script 66 to the function server 60. For the function server, both the client 54 and the center server 58 are clients. For this reason, the function server integrates the separately received process script 66 and data 64, executes required processing for the data, and sends back a result 68 to the client.

The process script is a program list which describes a sequence of a series of jobs executed by the center server using function servers. The center server executes a series of operations in accordance with the process script, and sends back only the final result to the client. Therefore, the load on the client can be very smaller than that in a conventional system which repeats accesses to individual servers. The process script is often automatically generated by a device driver of the client. The process script is merely a set of a series of function calls of communication protocols for the client, is a script language generated from a series of communication protocols for the center server, and is a communication protocol itself for the function servers.

Figure 5:
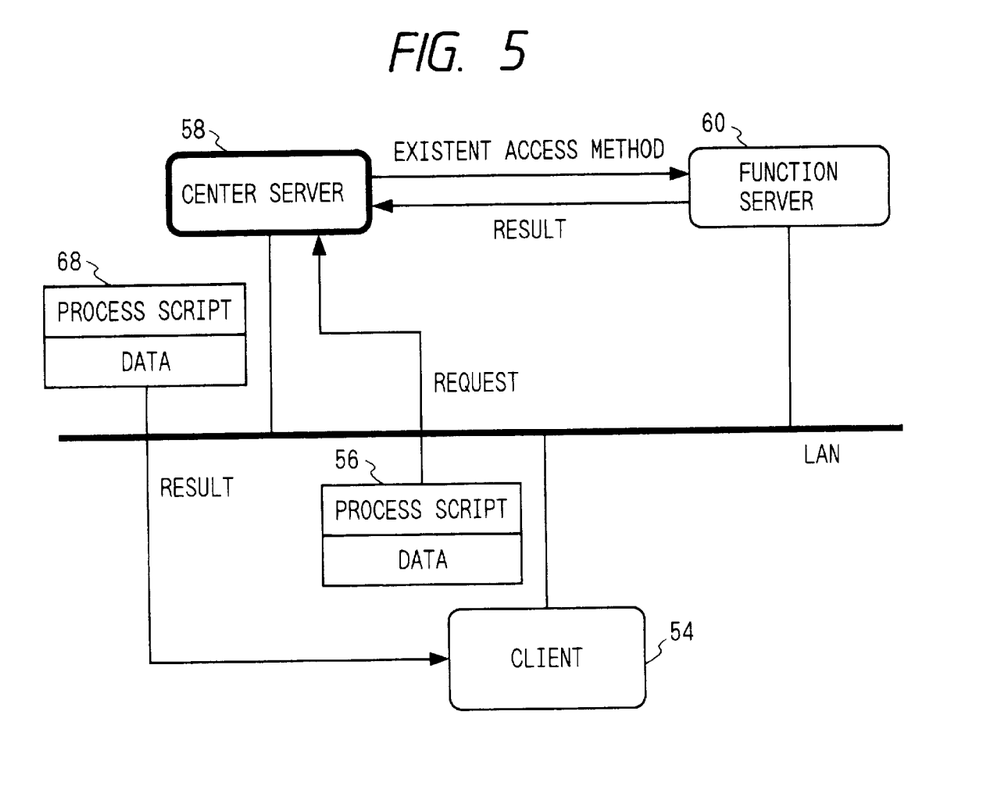
FIG. 5 is a diagram showing an access method executed when a function server is an existent server.

FIG. 5 shows an access method when the function server is an existent server. The same reference numerals in FIG. 5 denote the same parts as in FIG. 4. In this case, the message 56 is sent as a request to the center server 58 without being separated into a process script and data. If the center server does not have a requested function, it searches a function server 60 which can execute the function. Then, the center server informs the request from the client 54 to the function server 60 by an existent access method, and receives a processing result. The received result is sent back to the client 54 as the message 68.

One of the roles of the center server in the multimedia server is to standardize different access methods of various servers. When an application accesses the center server having the standardized interface, the center server executes accesses to individual servers for the application. Items to be standardized are two items, i.e., standardization of data and standardization of access methods. Data need not always be standardized to one format but may be standardized to a plurality of formats. For example, data is standardized to an industry standard format which does not depend on a specific application, and at the same time, exchange of non-standardized data is permitted. Major formats are as follows. Most of the formats are trademarks of development or sales companies.

QuickDraw
GDI
RTF
TIFF
PICT
Bitmap
PostScript
EPS
G3/G4
PCL
HP-GL
ANSI SQL
ACSII Text
UNICODE Text
Binary Data On the other hand, access methods are almost standardized to one format. With the standardized access method, various services can be easily utilized. However, industry standard access methods must be supported.

As has been described above with reference to FIG. 3, contents to be transmitted include a set of "process script" and "data". The "data" is information to be processed itself, and the "process script" is a command sequence which describes how to process the information. A set of "process script" and "data" are transmitted between servers and are subjected to required processing. By standardizing transfer methods of the "process script", various servers can be accessed by the single access method. For a server with a different protocol, the center server servers as a gateway.

For example, function calls for accessing a FAX server from a client are defined as follows:

MM_open("server", "fax_service");

MM_send(service_id, "MM_send", "G3", "data", "destination");

MM_data(service_id, "MM_send", "data_id", "length", "content_buffer");

MM_close(service_id);

As a result, the following script is transferred to the center server.

"MM_open server fax_service"

"service_id MM_send G3 data destination"

"service_id MM_send data_id length content"

"service_id MM_close"

Communications among an application, the client, and the center server are as follows. That is,

```
Application
Client          Center Server

MM_open("server", "fax_service");
    Message("MM_open server fax_service")---->
        <----Message("service_id MM_open_ack")
    qservice_id = service_id;
    return(MM_open_ack);
MM_send(service_id, "MM_send", "G3", "data", "destination");
    Message("service_id MM_send G3 data destination")---->
        <----Message("service_id MM_send_ack");
    return(MM_send_ack);
MM_data(service_id,
"MM_send", "data_id", "length", "content_buffer");
    Message("service_id MM_send data_id length content")---->
        <----Message("service_id MM_data_ack data_id);
    qdata_id = data_id;
```

-continued

```
Application
Client          Center Server return(MM_data_ack);
    :
    :
MM_close(service_id);
    Message("service_id MM_close")---->
        <----Message("service_id MM_close_ack)
    return(MM_close_ack);
```

An access sequence includes the following two different methods. That is,

Stored Forward

Real-time

The stored forward method is an accumulation exchange method. In this method, after a pair of process script and data are transmitted, a communication is temporarily finished independently of the successful/unsuccessful processing result, and a final processing result is checked after a communication is restarted. After the client leaves jobs to the servers, it can start the next job, thus improving utilization efficiency of resources. In the real-time method, a communication line is held until a final processing result is determined. In this method, although the jobs of the client are restricted, reliability of processing is high.

A digital exchange not only controls connections of a public line exchange network and an extension line exchange network but also can execute call control on the basis of a connection instruction from the center server. When a second communication line free from a delay is established via the extension line exchange network between a plurality of clients between which a communication line with a delay is established via the LAN, information (e.g., audio data) requiring real-time processing can be transmitted.

Figure 6:
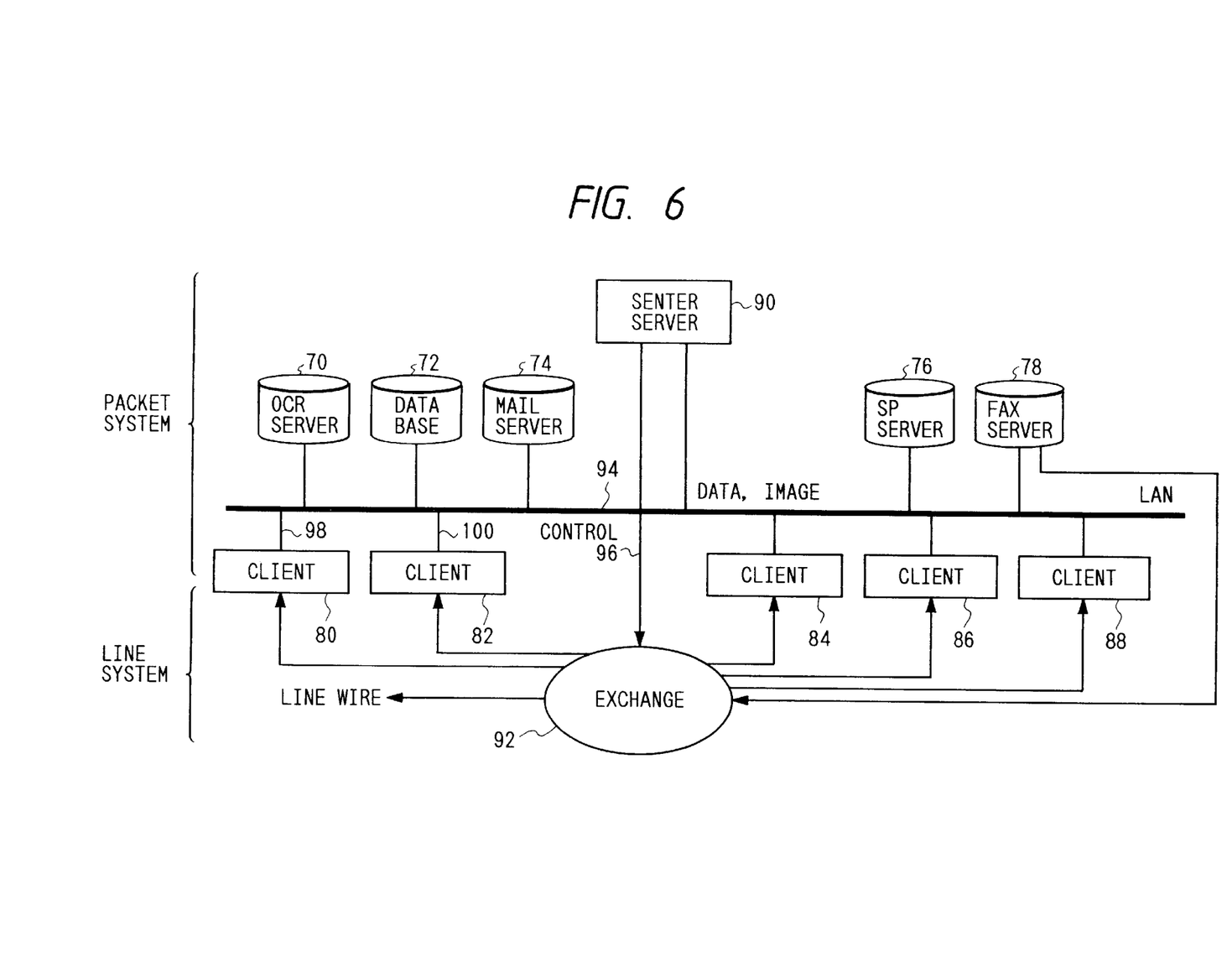
FIG. 6 is a diagram showing the arrangement of an embodiment of a multimedia server as a combination of a center server and an exchange.

FIG. 6 shows an embodiment of a multimedia server in which a center server and an exchange are coupled to each other. Referring to FIG. 6, the multimedia server includes various function servers 70 to 78, clients 80 to 88, a center server 90 for integrating the servers 70 to 78, a local area network (LAN) 94, and an exchange (PBX) 92 for exchanging extension/line wire telephone lines. Since data to be transmitted on the LAN 94 is packetized, such a packet system is not suited for transmission of a real-time system such as audio data, dynamic image data, and the like. However, by utilizing a feature that all clients are always connected, the packet system is suited for data transfer and multi-address communications which do not require connection control.

On the other hand, the PBX 92 is suited for transmission of a real-time system such as audio data, dynamic image data, and the like. By utilizing the features of the LAN and the PBX, a personal computer (PC) conference system can be constituted. A case will be exemplified below wherein a PC conference is held by accessing the client 82 from the client 80. The client 80 issues a start command script for starting a PC conference with the client 82 to the center server 90 via a node 98. The center server 90 makes a connection to a multimedia client demon (MCD) of the client 82, and issues a script for instructing the start of the PC conference. Note that the demon is a program which is always running in the background. Since the issued script describes an ID number of the PC conference, when the clients send scripts addressed to the ID number, a data communication between the clients can be realized.

The center server 90 accesses the PBX 92 via a control line 96 to connect telephone sets near (or incorporated in) the clients 80 and 82 to allow a speech communication.

As described above, the operators of the clients 80 and 82 can make speech communications and hold a PC conference while observing common windows on their computer image planes. The PC conference is not limited to a one-to-one connection, and three or more clients can be similarly connected.

In this manner, the LAN whose main role is to perform packet transmission and is inefficient in data transmission of a real-time system can be organically coupled to the exchange which is capable of exchange of audio/dynamic image data but is inefficient in multi-address communications or intelligent control, and a PC conference system can be constituted without adding any special optional parts to commercially available personal computers.

In the above embodiment, the system is constituted while assuming relatively easily commercially available components. However, when a network such as an FDDI having a transmission rate of 100 MB/sec can be utilized, a data packet and an audio line may be multiplexed. Similarly, the ISDN is assumed as a public network to be connected to the exchange PBX, but a B-ISDN may be used. Furthermore, when an SMDS-class public network in USA can be utilized, the LAN may be connected to the line wire. When the speed can be sacrificed slightly, an inter-LAN connection may be realized via the ISDN network like the SLIP (Serial Line IP) of the UNIX. With the state-of-the-art techniques, an inter-LAN connection can be realized using an ISDN router via the ISDN network.

Fields and services to which the present invention can be applied will be summarized below.

| (Field) | (Service) |
|---|---|
| Print | Color Print |
| Scan | Color Scanner |
| OCR | OCR, File Server, Slip Processing |
| Translation | Japanese to English |
| File System | NFS |
| Database | Text, Still Image, Dynamic Image, Audio |
| Conference System | Common Window + Real-time Audio |
| Mail | Text, Still Image, Dynamic Image, Audio |
| Contribution System | Text, Still Image, Dynamic Image, Audio |
| Image Processing | CMM, Filtering, Image Processing Accelerator |
| FAX | FAX Transmission/reception/distribution |
| MHS | Text, FAX, CATS |
| Reservation System | Reservation of Conference Room |

A comparison between this embodiment and the prior art will be made with reference to an operation wherein 10 originals are scanned, scanned images are converted into character codes via the OCR, and the converted codes are saved in a disk of a data server as a text file. This operation is processed as follows. That is,

```
Scan original by scanner ---> transmit to client
Image data ---> re-transfer to OCR server
```

```
Convert image into text data via OCR
Text data ---> transmit to client
Text data ---> transfer to disk of data server
```

The above-mentioned operation is repeated 10 times.

In contrast to this, in this embodiment, the above-mentioned operation is processed as follows. That is,

```
Client ---> transmit process script to center server
(Scan Original by scanner ---> transmit to client)
(Convert image data into text data via OCR)
(Text data ---> transfer to disk of data server)
Center Server ---> inform result to client
```

In the prior art, four data transmission operations via the client are required, and since a personal computer is not normally used for scanning as many as 10 originals at a time, 40 data transmission operations are required in the worst case. In contrast to this, in this embodiment, only two data transmission operations via the client are required, and all other communications are made between servers. The total number of times of data transmission also decreases. The decrease in the total number of times of data transmission means a decrease in the number of times of computer operations, thus remarkably automating jobs.

A comparison between this embodiment and the prior art will be made with reference to an operation wherein an A3-size original is scanned in a 400-dpi full-color mode using a network scanner, the scanned image data is subjected to color processing, and the processed image data is printed by a printer server. In the prior art, the above-mentioned operation is processed as follows. That is,

```
Scan Original ---> transmit to client
Image Data ---> color processing
Image data after color processing ---> transmit to printer server
Print
```

In contrast to this, in this embodiment, the above-mentioned operation is processed as follows. That is,

```
Client ---> transmit process script to center server
(Scan original)
(Image data ---> color processing)
(Image data after color processing ---> transmit to printer server)
(Print)
Center server ---> inform result to client
```

When an A3-size original is scanned in a 400-dpi full-color mode, the scanned image data has a size as large as about 96 MBytes. Such a giant main memory size must be managed by a workstation class.

A comparison between this embodiment and the prior art will be made with reference to an operation wherein a dynamic image file is transmitted to a server to execute presentation of dynamic images. In the prior art, the above-mentioned operation is processed as follows. That is, Giant dynamic image file→transmit to server In contrast to this, in this embodiment, the above-mentioned operation is processed as follows. That is,

```
Client ---> transmit dynamic image script to center server
(Center server <---> inter-function server communication)
Center server ---> inform result to client
```

The dynamic image file normally has a very large size. A movie of several 10 minutes often has a size exceeding 1 GBytes. In order to process such large-size data, a memory and a hard disk of the client must be extended, and in some cases, the CPU must be replaced by a high-speed one. However, in this embodiment, since the server stores dynamic image data, the memory and the hard disk of the client need not be extended, and the CPU can be a low-speed one. When a process script is issued to the multimedia server (center server) via the network, a dynamic image can be reproduced by the server.

A comparison between this embodiment and the prior art will be made with reference to conference system function processing taking a mail service as an example.

More specifically, a case will be exemplified below wherein an electronic blackboard, to which a plurality of clients are similarly connected and in which a single file can be opened, and data can be written in this file from anywhere, is prepared, the clients simultaneously access the exchange to connect their extension telephones so as to hold a PC conference. In the prior art, a text-based conference system without audio data can only be constituted. However, in this embodiment, the above-mentioned system is realized as follows. That is,

```
Client---> transmit conference request process script to center server
(Center server <---> inter-function server communication)
Client ---> electronic blackboard application is started and bell rings
(client <---> PC conference between client)
Client ---> transmit end process script to center server
Center server ---> inform result to client
```

An arrangement constituted when the multimedia server of this embodiment is used as an image drawing accelerator for a personal computer (e.g., Macintosh available from Apple Computer Inc.) will be described below with reference to FIG. 7. For example, in order to edit a B5-size full-color image at 400 dpi or higher, the main memory requires several 10 Mbytes. In a conventional personal computer, it is practically impossible to realize such processing in terms of the processing speed even if a virtual memory is used. In the embodiment shown in FIG. 7, when the multimedia server is used as a virtual memory on the network, a full-color high-resolution image of an A3 size or larger can be edited.

Figure 7:
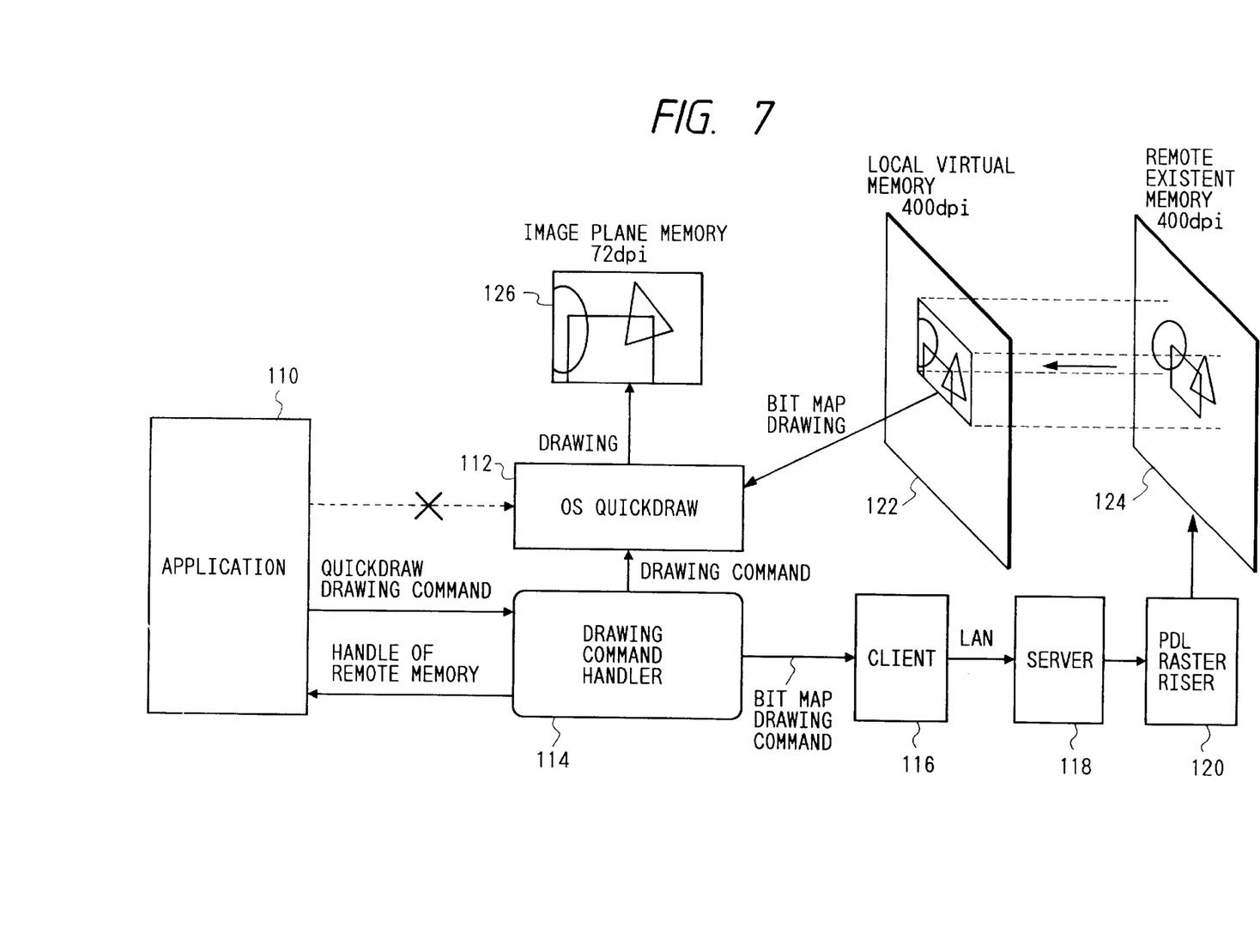
FIG. 7 is a diagram showing the arrangement of an embodiment when the multimedia server is used as an image drawing accelerator.

More specifically, referring to FIG. 7, an application 110 supplies a drawing command to QuickDraw (a trademark of Apple computer Inc.) 112 as a part of the OS to rasterize data on an image memory 126 when some data is to be displayed on a monitor. The application never directly accesses the image memory 126.

On the other hand, when a bit map image is to be displayed on the monitor, the application assures a drawing buffer memory on its own responsibility, draws an image on the assured memory in background processing, and thereafter, issues a memory transfer request to the QuickDraw 112. Therefore, the drawing buffer memory is under the control of the application. Conventionally, the drawing buffer memory is assured as a virtual memory, and an existent memory is set on the hard disk. However, in this embodiment, the existent memory is arranged on the multimedia server on the network, and when an image plane is updated, data is partially copied to a local memory.

A drawing command handler 114 is an API (Application Programming Interface) for transferring the function of the multimedia server to the application on the client side. The application 110 supplies the same parameters as a call to the QuickDraw to the API to draw an image on the memory assured on the server on the network.

Since an application is not always designed in consideration of use together with the multimedia server, a function call to the application 110 or Quickdraw 112 may be hooked, and the control may be forcibly passed to the drawing command handler 114. All function calls of the QuickDraw are executed by the exception handling, and their processing can be easily branched. In this case, the QuickDraw passes a drawing command to the image memory therethrough. Needless to say, an application which is designed in consideration of use together with the multimedia server has high drawing efficiency. On the other hand, a bit map drawing command to the memory is supplied to a PDL rasterizer 120 via a client 116 and a server 118. The bit map drawing command is rasterized to bit map data by the rasterizer 120, and the rasterized data is drawn on a remote existent memory 124 in the multimedia server. The remote existent memory has a capacity capable of storing all bit map data for one page.

A local virtual memory 122 has a limited capacity, and virtually overlaps the remote existent memory 124. However, an actually assigned memory area corresponds to a limited area which is currently being edited. If an area which is being edited is changed, image data in a new area is copied from the remote existent memory 124.

With this processing, image edit processing such as edit processing of an A3-size full-color image at 400 dpi, which is impossible for a conventional system to realize due to, e.g., a limitation on the memory capacity, can be realized from an inexpensive terminal by utilizing the resources on the network.

As can be easily understood from the above description, according to this embodiment, a server system capable of suitably processing multimedia information can be provided. In addition, service functions such as an OCR server, SP server, FAX server, database, and image processing, which are independently provided, can be integrally provided by a virtual integrated server on the network.

When a client connects the center server on the basis of a common communication protocol, it can easily utilize all services. Furthermore, an accelerator function with which the server accelerates client's processing can be provided. Services on the UNIX such as an electronic mail, news, FTP, and uucp can be easily utilized from a GUI environment on a personal computer.

Therefore, an application of each client can access the center server as a virtual server which integrates various function services regardless of communication protocols with various function servers connected on the network, and composite function processing including processing of a plurality of function servers can be efficiently executed by only transferring a script associated with desired function processing from a single application.

What is claimed is:

1. A multimedia network system comprising:
   a first, center server connected to a network, said first server having a first function for serving a first kind of data; and
   a plurality of second servers, each second server having a respective second function, different from the first function of said first server and different from all others of the second functions, for serving respective kinds of data different from the first kind of data, wherein said first server connects each said second server to a client connected to the network on the basis of a command issued by the client such that, for each said second server identified by the command, said second server executes a job on the basis of a process script to provide a job result, said first server combining the job results as a combined result and transmitting the combined result to the client.

2. A system according to claim 1, wherein said first server is a center server.

3. A system according to claim 1, wherein one of said second servers is an optical character reader server.

4. A system according to claim 1, wherein one of said second servers is a dynamic image server.

5. A system according to claim 1, wherein said first and second servers have different access methods respectively.

6. A multimedia server which is constituted by connecting a plurality of function servers for executing different function processing operations to a plurality of clients via a network, each said function server serving a respective kind of data different from a kind of data served by any other of said function servers, comprising:

reception means for receiving a message including a predetermined process script issued by each of the clients; and transfer means for interpreting the received message, executing respective communication protocol conversions of the message in correspondence with at least two of the function servers to provide respective converted process scripts, and combining each converted process script for the respective function server to form a combined result and transferring the combined result to a client via the network.

7. A server according to claim 6, wherein said reception means receives data associated with the process script.

8. A server according to claim 7, wherein said transfer means converts said data, and transfers the converted data to each of said function servers.

9. A server according to claim 7, wherein said data is dynamic image data.

10. A server according to claim 6, wherein said function servers include an optical character reader server.

11. A server according to claim 6, wherein said function servers include a dynamic image server.

12. A multimedia server which is constituted by connecting a plurality of function servers for executing different function processing operations to a plurality of clients via a network, each said function server serving a respective kind of data different from a kind of data served by any other of said function servers, said multimedia server comprising:

a communication line interface for connecting the clients;

reception means for receiving a message as a set of a predetermined process script and data issued by each of the clients; and transfer means for interpreting the received message, executing respective communication protocol conversions of the message in correspondence with respective ones of the function servers to provide respective converted process scripts, and combining each converted process script for the respective function server to form a combined result and transferring the combined result to a client via the network.

13. A server according to claim 12, wherein said data is dynamic image data.

14. A server according to claim 12, wherein said function servers include an optical character reader server.

15. A server according to claim 12, wherein said function servers include a dynamic image server.

* * * * *

UNITED STATES PATENT AND TRADEMARK OFFICE
CERTIFICATE OF CORRECTION

PATENT NO. : 6,163,796
DATED : December 19, 2000
INVENTOR(S) : Yoshikazu Yokomizo It is certified that error appears in the above-identified patent and that said Letters Patent is hereby corrected as shown below:

Title page,
Item [56], References Cited,

U.S. Patent Documents "5,332,266" should read -- 5,333,266 --.
Other Publications "smb.htnl," should read -- smb.html, --.

Item [63], RELATED U.S. APPLICATION DATA,
"Aug. 30," should read -- filed Aug. 30, --.

Sheet 3,
Figure 3, "MASSAGE" should read -- MESSAGE --.

Sheet 6,
Figures 6, "SENTER" should read -- CENTER --.

Column 1,
Line 13, "a" should be deleted.

Column 6,
Line 34, "very" should read -- much --.
Line 58, "accesses" should read -- access --.

Column 7,
Line 65, "_id) ;" should read -- _id") ; --.

Column 8,
Line 11, "_ack)" should read -- _ack") --.

UNITED STATES PATENT AND TRADEMARK OFFICE
CERTIFICATE OF CORRECTION

PATENT NO. : 6,163,796
DATED : December 19, 2000
INVENTOR(S) : Yoshikazu Yokomizo It is certified that error appears in the above-identified patent and that said Letters Patent is hereby corrected as shown below:

Column 11,
Line 55, "computer" should read -- Computer --.

Signed and Sealed this

Thirteenth day of November, 2001

Attest:

*Nicholas P. Godici*

NICHOLAS P. GODICI
*Attesting Officer*    *Acting Director of the United States Patent and Trademark Office*